United States Patent
Grange et al.

(10) Patent No.: US 8,833,665 B2
(45) Date of Patent: Sep. 16, 2014

(54) WRIST-WEARABLE DEVICE COMPRISING AN ANTENNA

(75) Inventors: Matthieu Grange, Neuchatel (CH); Martin Bisig, Zuchwil (CH); Amadou Hadji, Corcelles (CH)

(73) Assignee: ETA SA Manufacture Horlogère Suisse, Grenchen (CH)

(*) Notice: Subject to any disclaimer, the term of this patent is extended or adjusted under 35 U.S.C. 154(b) by 494 days.

(21) Appl. No.: 13/121,575

(22) PCT Filed: Oct. 14, 2009

(86) PCT No.: PCT/EP2009/063428
§ 371 (c)(1),
(2), (4) Date: Jun. 15, 2011

(87) PCT Pub. No.: WO2010/043656
PCT Pub. Date: Apr. 22, 2010

(65) Prior Publication Data
US 2011/0234461 A1    Sep. 29, 2011

(30) Foreign Application Priority Data

Oct. 17, 2008 (EP) .................................... 08166960

(51) Int. Cl.
| | |
|---|---|
| *G06K 19/00* | (2006.01) |
| *G01S 13/58* | (2006.01) |
| *H01Q 13/18* | (2006.01) |
| *G01S 7/03* | (2006.01) |
| *H01Q 1/27* | (2006.01) |

(52) U.S. Cl.
CPC ............... *H01Q 1/273* (2013.01); *G01S 13/58* (2013.01); *H01Q 13/18* (2013.01); *G01S 7/03* (2013.01)
USPC ......................................... 235/492; 235/487

(58) Field of Classification Search
USPC .................. 343/701, 702, 718; 235/487, 492; 340/10, 572
See application file for complete search history.

(56) References Cited

U.S. PATENT DOCUMENTS

| | | | | |
|---|---|---|---|---|
| 5,532,705 A | * | 7/1996 | Hama | ........................... 343/718 |
| 5,589,840 A | | 12/1996 | Fujisawa | |
| 6,307,520 B1 | | 10/2001 | Liu | |
| 7,778,118 B2 | * | 8/2010 | Lyons et al. | .................... 368/69 |

FOREIGN PATENT DOCUMENTS

| | | |
|---|---|---|
| GB | 2 431 522 | 4/2007 |
| JP | 63 163185 | 7/1988 |

OTHER PUBLICATIONS

International Search Report issued Feb. 23, 2010 in PCT/EP09/063428 filed Oct. 14, 2009.

* cited by examiner

*Primary Examiner* — Michael G Lee
*Assistant Examiner* — Matthew Mikels
(74) *Attorney, Agent, or Firm* — Oblon, Spivak, McClelland, Maier & Neustadt, L.L.P.

(57) ABSTRACT

A wrist-wearable device including an outer housing with a back cover, a front cover being parallel to the back cover, and a circumferential wall therebetween, the wall being perpendicular to the back cover and to the front cover. The device further includes at least one slot antenna configured to send and to receive electromagnetic signals, the slot antenna including a case made at least partly of an electrically conducting material and being fitted in the housing of the device. The case is limited on one side by an outer face lying substantially in a common plane with the wall of the housing. A slot extending substantially in a direction perpendicular to the back cover and the front cover is formed in the outer face of the case, the inside of the case thereby forming a cavity of the slot antenna.

12 Claims, 1 Drawing Sheet

WRIST-WEARABLE DEVICE COMPRISING AN ANTENNA

The present invention is directed to a wrist-wearable device comprising an outer housing with a back cover, a front cover being parallel to said back cover, and a circumferential wall there between, said wall being substantially perpendicular to the back cover and to the front cover. The wrist-wearable device can for example be a wrist-top computer or a watch. The device further comprises at least one antenna which is able to send and to receive electromagnetic signals.

There exist various watches and wrist-top computers comprising an antenna for wireless data transfer into and out of the device.

The UK patent application published as GB 2431522 A for example discloses a wrist-wearable device having an outer housing with a slot being formed in the housing to provide a slot antenna. The longitudinal direction of the slot is parallel to a dial portion of the wrist-wearable device and is used for wireless communication with a communication network.

Various portable radar speedometers are also known from prior art. Radar speedometers normally comprise a radar transmitter associated to a first antenna and a radar receiver associated to a second antenna. Often, patch antennas or rod antennas are used for this kind of application. A drawback of these antenna technologies is that they are not well-suited for flush assembly on metallic watch cases. Furthermore, due to capacitive loading, patch antennas gets easily detuned in the proximity of human tissue while rod antennas are apparently very sensitive to their surroundings and would thus be affected by the construction of the interior of a wrist-wearable device if integrated into such a device.

The present invention aims at integrating a radar speedometer in a wrist-wearable device. In particular, this integration should be possible independently on the material chosen for the outer housing of the wrist-wearable device, i.e. as well for metal housings as for a plastic housing.

This aim is achieved by a wrist-wearable device according to claim 1 with at least one slot antenna comprising a case having electrically conducting inner surfaces and being fitted in the housing. Said case is limited on one side by an outer face lying substantially in a common plane with the wall of the housing. A slot extending substantially in a direction perpendicular to the back cover and to the front cover is formed in said outer face of the case to form a vertical slot, the inside of the case thereby forming a cavity of the slot antenna.

The case of the slot antenna having electrically conducting inner surfaces serves as a cavity for the slot antenna. The invention can be used with a wrist-wearable device having a housing which is made of an electrically conducting material, in particular of metal, as well as with a device having a plastic housing. A slot antenna is very robust in terms of radiation characteristics against modifications of the interior of the watch case and is thus particularly suitable for radar speedometer applications as mentioned above. Furthermore, one can obtain a very large width of the main beam horizontal pattern.

Preferred embodiments of the invention arise from the dependent claims and the following description.

According to a preferred embodiment of the invention, the device comprises two slot antennas, each of them having a case and a slot being formed in the outer face of said case, wherein the circumferential wall comprises an high impedance portion lying between the outer faces of the two cases. An embodiment with two slot antennas is particularly suitable for a radar speedometer application, as one antenna can be associated to a radar transmitter and the other one to a radar receiver. It should be noted, however, that it is also possible to use only one slot antenna. In this case it is necessary to provide additional radio components such as circulators on the transceiver side. Such a solution is slightly more costly than a solution using tow antennas, but may be preferable in certain cases for aesthetic and design reasons.

When two slot antennas are employed, the high impedance portion lying between the outer faces of the two cases reduces surface coupling between the two slots.

The slot of the first antenna can be tilted with respect to the slot of the second antenna. Such an arrangement can be chosen for design reasons.

According to a preferred embodiment, the outer housing is at least partly made of a conducting material, in particular of metal, and the case of the slot antenna is electrically insulated from said outer housing. The capacitive coupling between the watch case and the antenna or antennas which would normally occur with a metal housing can thereby be considerably reduced.

According to an alternative embodiment of the present invention, the outer housing is substantially made of a non-conducting material. For example, the circumferential wall and the back cover can be made of a plastic material, while the front cover can either be made of glass or of a plastic material having a transparent portion.

When such a plastic housing is used, the device may advantageously comprise at least one electrically conducting surface on the circumferential wall. This electrically conducting surface will form a continuous antenna surface together with an adjacent outer surface of the case of the slot antenna. Such a bigger antenna surface can help to improve the radiation pattern.

According to a preferred embodiment of the invention, the device further comprises a shielding element lying in the plane of the back cover and protruding from the wall in an area below the slot antenna. When two slot antennas are provided, a common shielding element may be provided in an area below the two slot antennas, or two separate shielding elements, one below each slot antenna, may be provided. The shielding tilts the main lobe directivity, and radiation is thus guided away from the user's wrist.

Preferably the device further comprises a transmitter generating a radar signal and connected to a first slot antenna as well as a receiver and a signal processing unit connected to said receiver, the receiver being connected to the second slot antenna.

The signal processing unit can be arranged to compute a speed of a person wearing the wrist-wearable device using signals captured by the second slot antenna. The device may furthermore comprise display means which are arranged to display a speed and/or a covered distance calculated by a signal processing unit.

The subject matter of the invention will be explained more in detail in the following description with reference to the drawings, wherein.

Figure 1:
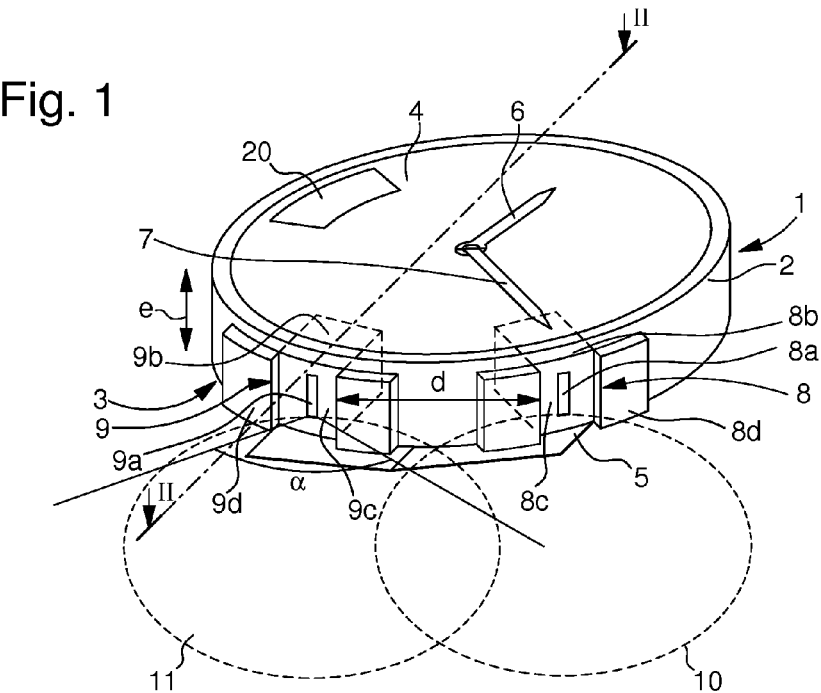
FIG. 1 is a perspective view of a device according to the invention.

It will be appreciated that the following description is intended to refer to one specific embodiment of the invention which has been selected for illustration in the drawings but which is not intended to define or limit the invention, other than in the appended claims.

FIG. 1 shows a perspective view of a wrist-wearable device, in the present case a wrist watch. The device comprises an outer housing 1 with a back cover 3 and a front cover 4, in the present case a glass for covering a dial with hands 6, 7 and an electronic display 20. A circumferential wall 2 lies between the back cover 3 and the front cover 4 and completes the housing 1. This wall 2 is shown as being substantially perpendicular to the front cover 4 and the back cover 3, but a toroidal or rounded shape or any other shape known in watch design is possible. It should also be noted, that the back cover 3 and the front cover 4 are shown as being circular, but they may also be oval or rectangular with or without rounded edges without departing from the scope of the present invention.

The device shown in FIG. 1 comprises two slot antennas 8, 9, each of them comprising a block-shaped case 8b, 9b and a slot 8a, 9a. The cases 8b, 9b are either made of metal or of another material having a metallized inner surface and form a cavity for the slot antennas 8, 9. This cavity can be filled with a dielectric material having a high dielectric constant and a low dielectric loss such as Teflon®, a dielectric ceramic material or an appropriate resin. Cavity backed slot antennas are known in the art and their function principle will thus not be discussed here. It should be noted, however, that the minimum slot length which is required depends on the wavelength of the radar signal, the permittivity of the dielectric filling material and the shape of the slot. For the present application it is in general desired to reduce the slot length as much as possible so that the height e (cf. FIG. 1) of the wrist wearable device can be reduced. To do so, the shape of the slot may be adapted. It is possible, for example, to use a slot comprising a vertical main slot as shown in the figures and to provide it with additional slot structures which are perpendicular to this main slot, i.e. parallel to the front cover 4 and back cover 3.

Both cases 8b, 9b have an outer face 8c, 9c which coincides with the circumferential wall 2 of the housing, the slots 8a, 9a being formed in said outer face, respectively. The outer faces 8c, 9c are metallized or made of metal and form an antenna surface together with adjacent metal plates 8d, 9d, as it will be explained below. In the embodiment shown in FIG. 1, the slots 8a, 9a are both oriented in a direction perpendicular to the back cover 3 and to the front cover 4 and are thus parallel to each other. However, one of the slots 8a, 9a may be slightly tilted with respect to the other slot 9a, 8a, and would in this case not be exactly perpendicular to back cover 3 and front cover 4. It is also possible to tilt the slot with respect to a vertical axis. For example, instead of being exactly perpendicular to the back cover 3 and front cover 4, the slots 8a, 9a could be arranged such that the angle between the front cover 4 and the slots 8a, 9a is smaller than 90°. In this case the radiation is directed away from the user's wrist. As mentioned above, the length of the slot 8a, 9a is determined by different factors, but it will normally be only slightly inferior to the height e of the circumferential wall 2 as shown in FIG. 2.

In the embodiment shown in FIG. 1, the housing 1 and in particular the wall 2 are made of a plastic material. The two cases 8b, 9b of the slot antennas 8, 9 are not directly adjacent, but are arranged at a certain distance d and are thus electrically insulated from each other. The invention is not limited to devices having plastic housings, however, and the housing 1 can be completely made of metal or comprise metallic parts. If the circumferential wall 2 is made of an electrically conducting material, a high impedance portion will be provided in the wall 2 between the outer surfaces 8c, 9c. Such a high impedance portion avoids a coupling of the two antennas via surface waves. A simple solution would be a plastic insert or a plastic element applied to the surface of the circumferential wall 2 between the two slot antennas 8, 9. Alternatively, one can also use appropriate geometrical structures formed in the metal wall 2 such as photonic bandgap structures.

Figure 2:
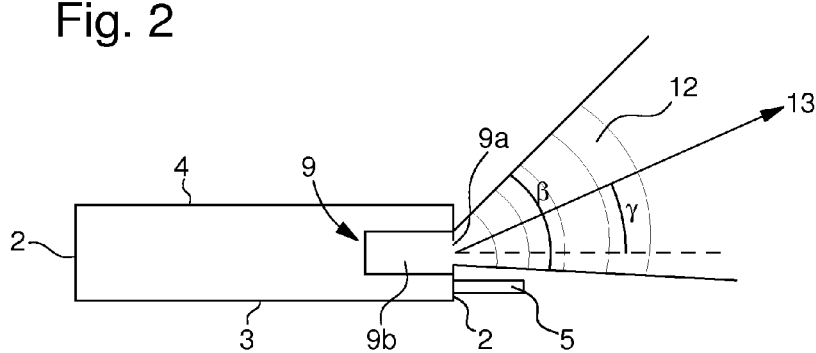
FIG. 2 is a cut view along the axis II-II in FIG. 1.

In the embodiment shown in FIGS. 1 and 2, two metal plates 8d, 9d are applied to the circumferential wall 2 on the left, respectively on the right, of each of the outer surfaces 8c, 9c of the antennas 8, 9. The electrically conducting surface of these metal plates 8d, 9d forms a continuous antenna surface together with the respective outer surface 8c, 9c of the slot antenna 8, 9, and the radiation pattern is improved thereby. It is obvious that it is not necessary to apply metal plates to the circumferential wall 2 of the housing 1 of the device, if the wall 2 itself is made of an electrically conducting material such as stainless steel or another metal. In such a case parts of the housing 1, in particular parts of the wall 2, can directly be part of the antenna surface.

The horizontal radiation pattern is denoted with the reference numerals 10, 11 in FIG. 1. The beam width a of the horizontal pattern (cf. FIG. 1) will be above 150°, preferably around 180° or higher, if the size of the outer surfaces 8c, 9c respectively the size of the metal plates 9c, 9d are chosen appropriately. Appropriate distance between the two slot antennas 8, 9, has to be selected to achieve the required value of antenna decoupling.

The housing 1 is provided with a shielding element 5 lying in the plane of the back cover 3 and protruding from the wall 2 below the slot antennas 8, 9 and below the segment of wall 2 lying between them. The effects of this shielding become clear when looking at FIG. 2 which shows a cut along the axis II-II in FIG. 1. One sees that the shielding 5 tilts the main beam directivity direction 13 with respect to the plane of the back cover 3, the tilting angle being denoted as γ in FIG. 2. This protects the user from the radiation emitted and received by the device, and an attenuation of the signal in the tissue of the user wearing the device is avoided. The vertical radiation pattern obtained is shown in FIG. 2. and denoted with the reference numeral 12. The beam width β of the vertical pattern 12 can reach up to 90° or more.

Figure 3:
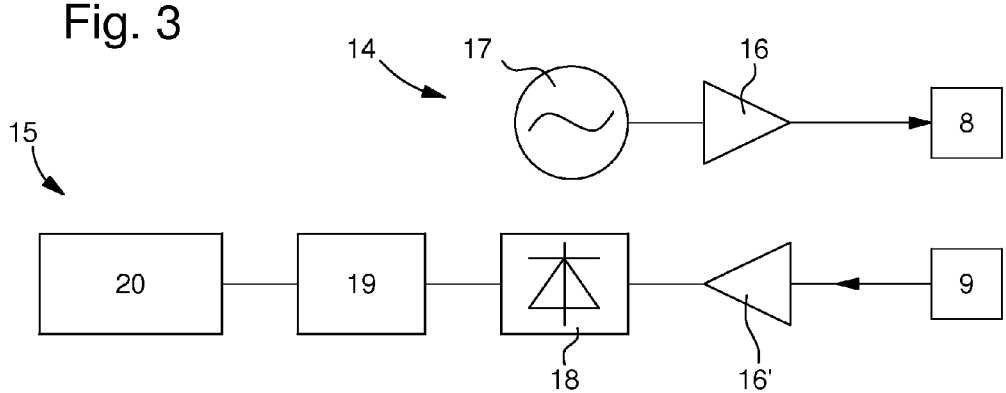
FIG. 3 is a block diagram of the electronic components of the device shown in FIGS. 1 and 2.

FIG. 3 is a block diagram showing the electronic components necessary for the implementation of a radar speedometer in the device shown in FIGS. 1 and 2. A transmission chain 14 associated to a first slot antenna 8 comprises a radar transmitter 17 emitting a radar signal which is amplified by an amplifier 16. The amplified radar signal will be emitted via the slot antenna 8.

The second slot antenna 9 is part of a reception chain 15 and is connected to a signal processing unit 19 via a receiver 18 and an amplifier 16' amplifying the signal received by the antenna 9. The signal processing unit 19 calculates a speed of the user wearing the device shown in FIG. 1 using an appropriate algorithm. Based on the speed, the signal processing unit may also calculate the distance covered by the user. The speed and/or the distance covered can then be shown by the display 20 which is integrated into the device.

REFERENCE NUMERALS 1 housing
2 circumferential wall
3 back cover
4 front cover
5 shielding
6, 7 hands
8, 9 slot antenna
8a, 9a slot
8b, 9b case
8c, 9c outer surface of case
8d, 9d electrically conducting surface 10, 11 horizontal radiation pattern
12 vertical radiation pattern
13 main beam directivity direction
14 radar emission unit
15 radar reception unit
16, 16' amplifier
17 radar transmitter
18 radar receiver
19 signal processing unit
20 display
α horizontal beam width
β vertical beam width
γ radiation tilt angle
e height housing
d distance

The invention claimed is:

1. A wrist-wearable device comprising:
an outer housing with a back cover, a front cover being parallel to the back cover, and a circumferential wall there between, the wall being perpendicular to the back cover and to the front cover and being made of an electrically conducting material; and
two slot antennas configured to send and to receive electromagnetic signals, each slot antenna comprising a case comprising electrically conducting inner surfaces and being fitted in the housing, the case being limited on one side by an outer face lying substantially in a common plane with the wall of the housing, a slot extending substantially in a direction perpendicular to the back cover and the front cover is formed in the outer face of the case, an inside of the case thereby forming a cavity of the slot antenna wherein a high impedance portion is provided in the circumferential wall between the outer faces of the two cases.

2. The device according to claim 1, wherein the high impedance portion comprises a portion made of an electrically insulating material or a geometrical structure avoiding surface coupling.

3. The device according to claim 1, wherein the case occupies substantially a complete space in a direction ranging from the back cover to the front cover.

4. The device according to claim 1, further comprising a shielding element lying in the plane of the back cover and protruding from the wall in an area below the slot antenna.

5. The device according to claim 1, wherein the outer housing is at least partly made of a conducting material, or is at least partly made of metal.

6. The device according to claim 1, wherein at least one of the circumferential wall and the back cover is made of a non-conducting material, or is are made of a plastic material.

7. The device according to claim 6, comprising at least one electrically conducting surface on the circumferential wall, the electrically conducting surface forming a continuous antenna surface together with an adjacent outer surface of the slot antenna.

8. The device according to claim 1, wherein the slot of a first slot antenna is tilted with respect to the slot of a second slot antenna.

9. The device according to claim 1, further comprising a transmitter generating a radar signal and connected to a first slot antenna, and a receiver connected to a second slot antenna, an output of the receiver being transmitted to a signal processing unit.

10. The device according to claim 9, wherein the signal processing unit is configured to compute at least one of a speed of and a distance covered by a person wearing the wrist wearable device using signals captured by the second slot antenna.

11. The device according to claim 1, further comprising a signal processing unit configured to compute a speed of a user wearing the device and a display arranged to display the speed.

12. The device according claim 11, wherein the signal processing unit is further configured to compute a distance covered by the user wearing the device, the display arranged to display the speed and the distance covered.

* * * * *